United States Patent [19]

Auman

[11] Patent Number: 5,145,899
[45] Date of Patent: Sep. 8, 1992

[54] POLYMERS MODIFIED BY KETONIC AND ETHER-KETONIC COMPOUNDS

[75] Inventor: Brian C. Auman, Newark, Del.

[73] Assignee: E. I. Du Pont de Nemours and Company, Wilmington, Del.

[21] Appl. No.: 662,523

[22] Filed: Feb. 28, 1991

[51] Int. Cl.⁵ .................................................. C08K 5/07
[52] U.S. Cl. ..................................... 524/357; 524/359
[58] Field of Search ................................. 524/357, 359

[56] References Cited

U.S. PATENT DOCUMENTS

| | | | |
|---|---|---|---|
| 4,250,279 | 2/1981 | Robeson et al. | 525/425 |
| 4,293,670 | 10/1981 | Robeson et al. | 525/436 |
| 4,360,606 | 11/1982 | Tobias et al. | 523/124 |
| 4,532,305 | 7/1985 | Dickinson | 525/390 |
| 4,613,645 | 9/1986 | Robeson et al. | 524/443 |
| 4,703,081 | 10/1987 | Blackwell et al. | 524/592 |
| 4,704,448 | 11/1987 | Brugel | 528/125 |
| 4,720,537 | 1/1988 | Brugel | 528/125 |

FOREIGN PATENT DOCUMENTS 0167897  6/1985  European Pat. Off. .

OTHER PUBLICATIONS

J. E. Harris and L. M. Robeson, Miscible Blends of Poly(aryl Ether Ketone)s and Polyetherimides, 1988, pp. 1878–1891.

*Primary Examiner*—Paul R. Michl
*Assistant Examiner*—Olga Asinovsky

[57] ABSTRACT

Polymers comprising carbonyl groups in their backbone, such as polyesters and polyimides, which have been modified by compounds having ketonic groups in their backbone, and molecular weights in the region of 300 to under 1,000. Preferably, these compounds have also ether groups in their backbone.

6 Claims, No Drawings

POLYMERS MODIFIED BY KETONIC AND ETHER-KETONIC COMPOUNDS

FIELD OF THE INVENTION

This invention relates to polymers comprising carbonyl groups in their backbone, such as polyesters and polyimides, which have been modified by compounds having ketonic groups in their backbone. Preferably, these compounds have also ether groups in their backbone.

BACKGROUND OF THE INVENTION

A number of polymers which contain carbonyl groups in their backbones, such as for example polyesters and polyimides, depending on their structure, may be hard, stiff, and difficult to process. However, they are valuable because of other desirable properties, which vary depending on the application.

Polyesters are usually less expensive than polyimides, and they may be preferred to polyimides for this reason in a number of occasions, if the requirements for the particular application permit; for example, if the end-use temperature is not very high.

Polyimides constitute a class of valuable polymers being characterized by thermal stability, inert character, usual insolubility in even strong solvents, and high $T_g$, among others. Their precursors are usually polyamic acids, which may take the final imidized form either by thermal or by chemical treatment. Polyimides have always found a large number of applications requiring the aforementioned characteristics in numerous industries, and recently their applications have started increasing dramatically in electronic devices, especially as dielectrics. With continuously escalating sophistication in such devices, the demands on the properties and the property control are becoming rather vexatious. Especially for the electronics industry, improvements of polyimides are needed in forming tough, pin-hole free coatings, having lower dielectric constant, lower coefficient of thermal expansion, lower moisture absorption, and decreased stiffness, among others. Although it is not usually possible to maximize all properties, since many of them may be antagonistic, optimization as a total is highly desirable and it may be achieved if adequate control on the properties becomes available through molecular architecture or other means.

One of the major problems is that in many instances, when all other properties have been optimized, stiffness and difficult processibility, such as thermal processing, remain unresolved, due mainly to very high $T_g$, and very high viscosity above $T_g$.

In order to overcome this difficulty, polyethers and polyetherketones of at least moderate average molecular weight have been utilized in the past, admixed with the polyesters and the polyimides under consideration for lowering the $T_g$. Commonly used plasticizers with other polymers are avoided in this case as subject to exudation sooner or later, and other disadvantages, such as for example lack of high thermal stability, volatility at high processing temperatures, and the like.

Miscible blends of poly(aryl ether ketone) s and polyetherimides are described by Harris et al. in the Journal of Applied Polymer Science, Vol. 35, pp. 1877-1891 (1988).

U.S. Pat. No. 4,532,305 (Dickinson), issued Jul. 30, 1985, describes a plasticized thermoplastic polymer composition comprising in admixture, a thermoplastic polymer selected from a polyarylate, a polyetherimide, an aromatic polycarbonate, a poly(aryl ether) having a molecular weight in excess of 10,000 and mixtures thereof and a plasticizing amount of a poly(aryl ether) having a molecular weight of from about 1,000 to about 5,000.

U.S. Pat. No. 4,250,279 (Robeson et al), issued Feb. 10, 1981, describes molding compositions of blends of a polyarylate derived from a dihydric phenol and an aromatic dicarboxylic acid, and a polyetherimide. These blends can additionally contain thermoplastic polymers which are compatible with the blend of polyarylate and polyetherimide.

U.S. Pat. No. 4,293,670 (Robeson et al), issued Oct. 6, 1981, describes molding compositions of blends of a poly(aryl ether) resin and a polyetherimide resin. These compositions are claimed to have improved environmental stress crack resistance.

U.S. Pat. No. 4,613,645 (Robeson et al), issued Sep. 23, 1986, describes thermoplastic, injection moldable composites comprising at least one poly(aryl ether ketone) having silicon carbide whiskers dispersed therein exhibit excellent tensile properties coupled with high elongation relative to poly(aryl ether ketone) composites with other inorganic fibers. The composites are useful for making articles such as electrical connectors.

U.S. Pat. No. 4,703,081 (Blackwell et al.), issued Oct. 27, 1987, describes a ternary polymer alloy containing a poly(arylene sulfide), a poly(amide imide), and at least one of a poly(aryl ketone) and a poly(aryl sulfone). The polymer alloy optionally can contain a fibrous reinforcing material such as a glass fiber.

U.S. Pat. No. 4,704,448 (Brugel), issued Nov. 3, 1987, describes copolyetherketones derived from diphenyl ether and aromatic diacids or diacid halides where the diphenyl ether is present in a molar excess relative to the diacid or diacid halide chlorides of about 2 to 8%.

U.S. Pat. No. 4,720,537 (Brugel), issued Jan. 19, 1988, describes branched copolyetherketones comprising condensation products of diphenyl ether, aromatic acid halides and trifunctional comonomers. U.S. Pat. No. 4,816,556 (Gay et al.), issued Mar. 28, 1989, describes ordered copolymers of tere- and isophthalyl halides with diphenyl ether where the phthalyl groups alternate or where the terephthalyl or isophthalyl groups are in blocks. These ordered copolyetherketones exhibit a higher level of crystallization and more rapid crystallinity behavior than corresponding random copolyetherketones. They also form completely miscible blends with certain aromatic polyetherimides.

European Patent Application Publication 0 167 897 A1 (Dickinson), published Jan. 15, 1986, is directed to a plasticized polyarylate composition comprising in admixture, a polyarylate, derived from a dihydric phenol and at least one aromatic dicarboxylic acid and having a reduced viscosity of from about 0.4 to greater than 1. dc/g, from about 5 to 30 weight percent of glass fibers, and a plasticizing amount of an oligomeric poly(aryl) ether having a reduced viscosity of from about 0.1 to about 0.45 dl/g.

Some of the major problems with the approaches suggested thus far are that polyethers and polyetherketones:

have a more or less broad distribution of molecular weights as being polymers or oligomers, which prevents good reproducibility, their efficiency is low and are needed in relatively large amounts to exhibit an appreciable effect, and they may introduce undesirable phenomena, due to the high concentration required.

In contrast, the present invention utilizes ketone and etherketone compounds as opposed to polymers or oligomers, which have molecular weights in a specific range between about 300 and under 1,000. Compounds are substantially monodisperse moieties, while polymers or oligomers have typically a large polydispersity, unless specific procedures have been used in their preparation. Even then, only in limited situations it is possible to reach a polydispersity lower than 2. In addition, the compatibility of higher molecular weight polymers, especially in the case of some polyesters, is better with lower molecular weight moieties. These differences are very important to the present invention, as it will be seen hereinunder.

None of the above references describes, suggests, or implies compositions, where the modifier is a ketonic compound, preferably containing ether groups in the backbone, and having a molecular weight in the region of 300 to under 1,000. In addition, none of the references recognizes the importance of utilizing in the composition substantially monodisperse modifiers.

SUMMARY OF THE INVENTION

The instant invention is directed to polymers comprising carbonyl groups in their backbone, such as polyesters and polyimides, which have been modified by compounds having ketonic groups in their backbone, and molecular weights in the region of 300 to under 1,000. Preferably, these compounds have also ether groups in their backbone. More particularly, this invention pertains to a composition of matter comprising:

(a) a condensation polymer selected from the group consisting of polyester and polyimide, and (b) a modifier consisting essentially of a compound having a formula $R^2—R^1—R^0—R^1—R^2$ wherein $R^0$ is

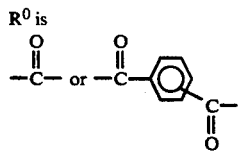

$R^1$ is

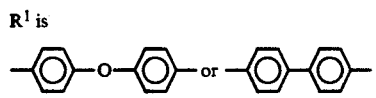

$R^2$ is

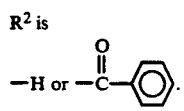

This invention also pertains to a composition of matter comprising:

(a) a condensation polymer selected from the group consisting of polyester and polyimide, and (b) a modifier consisting essentially of a compound having a formula

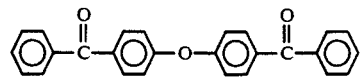

or

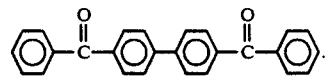

Preferably, the modifier in both cases has a polydispersity of substantially 1.

DETAILED DESCRIPTION OF THE INVENTION

The instant invention is directed to polymers comprising carbonyl groups in their backbone, such as polyesters and polyimides, which have been modified by compounds, as opposed to polymers, having ketonic groups in their backbone, and molecular weights in the region of 300 to under 1,000. Preferably, these compounds have also ether groups in their backbone.

The polyesters and polyimides utilized in the practice of the present invention, preferably aromatic for better thermal stability, may be prepared in any number of conventional ways well known to the art. Depending on their structure and on the function that they have to fulfill, however, they may be too hard, or too stiff, or too difficult to process thermally, and the like. Nevertheless, many times they are valuable because of other desirable properties, which vary, depending on the final application.

In the past, as aforementioned, in order to overcome this difficulty, polyethers and polyetherketones of at least moderate weight average molecular weight in the form of oligomers or polymers have been utilized, admixed with the polyesters and the polyimides under consideration for lowering the $T_g$.

Some of the advantages of using compounds instead of polymers as modifiers in the compositions of the present invention are:

since compounds have a narrow distribution of molecular weights when compared to polymers, the reproducibility achieved in their use is very high; and their efficiency is high, and thus they are needed in relatively small amounts in order to exhibit an appreciable effect;

Since the compounds of the present invention have molecular weights in the range of 300–1000, they are adequately non-volatile to substantially avoid evaporation during curing or processing of the polymer which they modify, and at the same time their effect, especially regarding $T_g$ and melt viscosity, is maximized.

The level of modifier that can be incorporated into a polyimide or polyester may be determined partially by the miscibility characteristics of the compound with the structure of the polymer. For polyester materials, it is expected that many structures are miscible with the modifiers, while others, especially those of the liquid crystal polymer (LCP) variety, may be immiscible or display a miscibility limit based on structure. In that case, a point is reached where the compound no longer forms a homogeneous blend and phase-separates from the polymer. Such a situation is normally undesirable from a property standpoint, so that exceeding this limit should typically be avoided. Likewise, many different polyimide and polyetherimide structures are also expected to be miscible with the modifying compounds; however, some structures, especially those of very rigid nature, e.g., BPDA/PPD or PMDA/PPD) may be expected to have a lower miscibility limit or be immiscible. The level at which a miscibility limit occurs is governed to some extent by the molecular weight of the modifier. Generally, the higher the molecular weight, the lower the miscibility limit in the polymer. On the other hand, while a lower molecular weight additive tends to have a larger impact on properties and better miscibility, a lower limit of molecular weight is reached, beyond which the volatility of the modifier is undesirably high at polymer processing temperatures.

The level of modifier that can be incorporated may also be limited by the amount that can be used while maintaining desired mechanical property levels, since low molecular weight compounds would be typically be expected to deteriorate the mechanical properties of polymers when used in excessive amounts.

Often, polyimides may be prepared which exhibit crystalline transition(s) as-prepared, but lose this crystallinity once heated or processed about the transition temperature. Normally, this crystallinity is not recoverable. Since it is known that crystallinity in polymers often leads to useful property improvements, e.g., strength, modulus, solvent resistance, it is desirable to develop methods whereby crystallinity in polyimides may be achieved or enhanced. Such methods in which the solvent N-methyl-2-pyrrolidone is used to treat amorphous samples of a polyimide known commonly as LARC-TPI are known to the artisans. Although this method has been shown to induce crystallinity in LARC-TPI, generally solvent treatment after processing to induce crystallinity in prepared parts is undesirable from a commercial standpoint. It would be preferred to have a crystallinity promoter or enhancer as part of the polymer mixture that could function during polymer processing. The compounds of the present invention fulfill such a need in that it has been demonstrated that crystallinity may be achieved during melt processing of a polyimide such that a semicrystalline polyimide may be achieved directly from extrusion or injection molding. The compounds of the present invention have the advantage over solvents in that their higher molecular weight and low volatility minimizes their loss via outgassing during high temperature processing and the shrinkage and voiding that might accompany such loss.

Table 1 summarizes the performance of modifier in polyimides. It is very important to note that even small amounts, in the region of 5–10% by weight, decrease the water absorption considerably. Also in the Examples, it is shown that the melt viscosity and $T_g$ decrease appreciably with relatively small amounts of modifier. The crystallization of polyimides may also be enabled or enhanced by the presence of the modifying compounds of the present invention. Often, the more crystalline a polymer the better its functional properties, such as for example solvent resistance, heat resistance, and the like. This is a very high attribute that the modifiers of the present invention offer.

It is worth noting, that depending on the application, a soluble modifier may be required, such as in the case where, the polyimide for example is to be applied on a substrate as a coating from solvent at room temperature. Indeed, one may use in such an occasion 1,3-bis(4-phenoxybenzoyl)benzene (DID), which is soluble in N-methyl-2-pyrrolidone at room temperature. On the other hand, 1,4-bis(4-phenoxybenzoyl)benzene (DTD) is largely insoluble in N-methyl-2-pyrrolidone at room temperature (it is only soluble at elevated temperatures) and it may be used in other applications, such as for example for lowering the melt viscosity of otherwise intractable polymers according to the present invention. However, polymers of the polyether ketone type are typically either insoluble, or have reduced solubility, or may increase solution viscosity in solution coatings, such that they are typically unsuitable for addition to poly(amic acid) solutions. This is one of the reasons why polyether ketones or oligomeric ether ketones are not as good as compounds of this invention.

The compositions of the present invention comprise a condensation polymer selected from the group consisting of polyesters and polyimides, having a weight average molecular weight higher than 10,000. It is important that the weight average molecular weight is preferably higher than 15,000, more preferably higher than 20,000, and even more preferably in the range of 30,000 to 300,000, so that it provides the polymer with generally good functional properties.

It is important that a modifier is incorporated in the polyimide or polyester by addition of a compound having a formula $$R^2-R^1-R^0-R^1-R^2$$

where, $R^0$ is

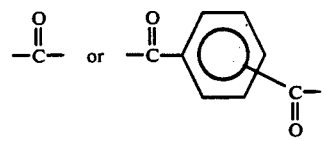

$R^1$ is

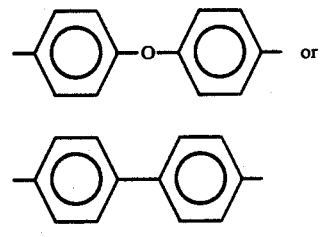

$R^2$ is

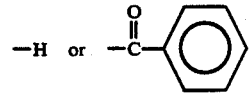

The modifier compounds utilized according to the present invention may be made so that they have a polydispersity of substantially 1, in contrast to polymeric species containing a larger number of the same or similar units, which develop polydispersities differing considerably from 1.

In order to obtain a substantially monodisperse compound, it may be necessary to use an excess of one of the reactants as for example in Examples 23 and 24. In these cases, for the synthesis of 1,3-bis(4-phenoxybenzoyl)benzene or 1,4-bis(4-phenoxybenzoyl)benzene, an excess of diphenyl ether versus isophthaloyl chloride or terephthaloyl chloride of at least 3 to 1 or higher is preferable in order to prevent substantial amounts of oligomeric poly ether ketones from forming which would detract from the utility of this invention. The amount of excess used is preferably the minimum amount which under the chosen reaction conditions gives essentially monodisperse products. Levels higher than this further assure the monodispersity of the compound but are less desirable because they increase the level of unreacted starting material which must be removed from the final product. It has been found that excesses of at least 3 to 1 up to about 5 to 1 are most preferable in the synthesis of compounds of this type.

Compositions made by adding modifiers similar to those of the present invention in the form of low molecular weight tail of a polymeric species having high polydispersity are certainly inferior when compared to compositions made by adding the modifier of this invention in its substantially monodisperse form. This is because in the former case the major active ingredient constitutes only a small amount of the total additive, while in the latter case it constitutes substantially 100% of the major active ingredient. In the former case, it is not only that the active ingredient is added in a grossly diluted form, but also in most instances, the inactive ingredient is undesirable as an ingredient of the polyimide or polyester as it may deteriorate their properties, including reproducibility and solubility.

It is preferable that $R^1$ is

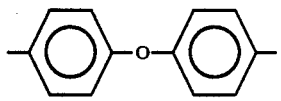

and $R^2$ is

—H while $R^0$ is preferably

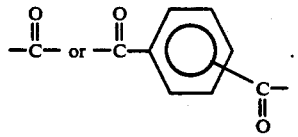

In another preferable embodiment, $R^1$ is

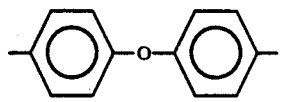

and $R^2$ is

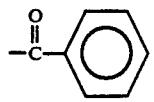

while $R^0$ is preferably

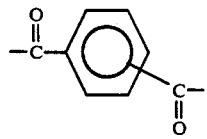

In still another preferred embodiment of this invention, the modifier is

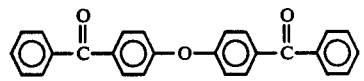

or

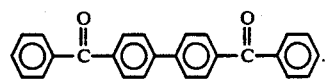

Examples demonstrating the instant invention are given below for illustration purposes only, and should not be construed as restricting the scope or limits of this invention in any way. All parts and percents are by weight and degrees are in centigrade unless otherwise indicated.

GLOSSARY

1/s: Reciprocal seconds
Avimid K: Polyimide based on pyromellitic dianhydride from Du Pont, Wilmington, Del.
BDTDB: 1,4-bis{4-([4-benzoyl]phenoxy)benzoyl}benzene
BPDA: 3,3',4,4'-biphenyltetracarboxylic acid dianhydride
CTE: Coefficient of Thermal Expansion
dHm: Heat of melting
DID: 1,3-bis(4-phenoxybenzoyl)benzene
DSC: Differential Scanning Calorimetry
DTD: 1,4-bis(4-phenoxybenzoyl)benzene
GPC: Gel Permeation Chromatography
J/g: Joules per gram
LCP: Liquid Crystal Polymer
L/d: Length to diameter ratio
ODBP: Oxydibenzophenone
ODA: 4,4'-oxydianiline
Pa.s: Pascal.seconds
PMDA: Pyromellitic dianhydride
PPD: p-phenylenediamine
Pyralin ® PI-2540: PMDA/ODA poly(amic acid) solution from Du Pont, Wilmington, Del.
Pyralin ® PI-2611: BPDA/PPD poly(amic acid) solution from Du Pont, Wilmington, Del.
$T_g$: Glass transition temperature
Tm: Melting temperature

EXAMPLE 1

In a glass container, 66.5 g of Avimid K polyimide powder was dry blended with 3.5 g of 1,4-bis(4-phenoxybenzoyl)benzene (DTD) (95% Avimid K, 5% DTD). After drying overnight at approximately 125° C. to remove any moisture present, the mixture was charged to a Haake torque rheometer (small bowl mixer, high shear cam mixing blades) at 360° C., and mixed for 10 min at 64 rpm. Afterwards, the polymer melt was removed from the mixer via a brass spatula, allowed to cool to room temperature and then ground to a coarse powder in a Thomas cutter. DSC measurements (Du Pont 1090, 20° C./min, 2nd heating scan) revealed a $T_g$ of 236° C. and capillary melt rheology (370° C., L=0.993, d=0.029, L/d=34.241) gave a melt viscosity of 1299 Pa.s at 385 1/s.

COMPARATIVE EXAMPLE 1

A similar procedure as that given in Example 1 was followed for Avimid K polyimide containing no 1,4-bis(4-phenoxybenzoyl)benzene (DTD). A very viscous melt resulted which caused a very high torque on the Haake instrument. DSC measurements showed a $T_g$ of 260° C. for this material and melt rheology yielded a melt viscosity of 2670 Pa.s at 385 1/s. The as-received Avimid K (no melt processing) exhibited no readily discernable $T_g$ and had a Tm of 351° C., dHm=26.9 J/g.

EXAMPLE 2

A similar procedure as that given in Example 1 was followed except that 63 g of Avimid K polyimide powder was blended with 7 g of 1,4-bis(4-phenoxybenzoyl)-benzene (DTD) (90% Avimid K, 10% DTD). The blend exhibited a $T_g$ of 216° C. and a melt viscosity of 670 Pa.s at 385 1/s.

EXAMPLE 3

A similar procedure as that given in Example 1 was followed except that 48 g of Avimid K polyimide powder was blended with 8.5 g of 1,4-bis(4-phenoxybenzoyl)benzene (DTD) (85% Avimid K, 15% DTD). The blend exhibited a $T_g$ of 194° C. This blend also exhibited a bimodal Tm with endothermic maxima at 288° and 332° C., total dHm=10.9 J/g, indicating the ability of the polymer to crystallize from the melt at this level of modifier.

EXAMPLE 4

A similar procedure as that given in Example 1 was followed except that 56 g of Avimid K polyimide powder was blended with 14 g of 1,4-bis(4-phenoxybenzoyl)benzene (DTD) (80% Avimid K, 20% DTD). The blend exhibited a $T_g$ of 174° C. and a melt viscosity of 205 Pa.s at 385 1/s. This blend also exhibited a bimodal Tm with endothermic maxima at 275° and 334° C., dHm=2.4, and 10.3 J/g, respectively. This result indicates the ability of the polymer to crystallize from the melt at this modifier level.

EXAMPLE 5

A procedure similar to that given in Example 4 was used to prepare another 80/20 {Avimid K}/{1,4-bis(4-phenoxybenzoyl)benzene} blend. This blend was melted and ram press spun through a spinneret (3380 micron diameter holes, 1.14 1/d ratio, stainless steel mesh screens in order of distance from spinneret of 50-325-50-200-50-100-50 mesh), at 352° C. spinneret temperature and 1570 psi ram pressure, and wound up at 386 to 950 meters/min to produce tough, lustrous monofilament fibers which at a windup speed of 650 meters/min had the following tensile properties:
Denier=25
Tenacity (g/den.)=2.1
Elongation=27%
Modulus (g/den.)=47
Work to Break (g/den.)=0.46

EXAMPLE 6

A dried blend of 80/20 {Avimid K}/{1,4-bis(4-phenoxybenzoyl)benzene} (DTD) was melt compounded (360° C. melt temp) in a 28 mm W & P twin screw extruder to produce a uniform cylindrical strand of material which was subsequently chopped into small pellets. Melt viscosity of these pellets was found to be 280 Pa.s at 385 1/s. After drying, the pellets were fed into a Arburg 1.5 oz. injection molding machine to produce injection molded 1/8 in. tensile and flex bars. Conditions: 365° C. nozzle temperature, 1300 psi boost injection pressure, ram speed=5, screw speed=200 rpm, mold temperature=90° C. Mechanical properties of these bars were measured and the following results were obtained:
Tensile modulus=639 KPSI
Tensile strength=13.5 KPSI
Tensile elongation at break=2.7%
Flexural modulus=636 KPSI
Flexural strength=27.6 KPSI
Izod Impact=0.8 ftlb/in

EXAMPLE 7

A similar procedure as that given in Example 1 was followed except that 56 g of Avimid K polyimide powder was blended with 14 g of BDTDB (80% Avimid K, 20% BDTDB). The blend exhibited a $T_g$ of 183° C. and a melt viscosity of 260 Pa.s at 385 1/s. This blend also exhibited a bimodal Tm with endothermic maxima at 272° and 329° C., total dHm=9.5 J/g, indicating crystallization of the polymer from the melt at this modifier level.

EXAMPLE 8

The blends prepared in Examples 1 and 2 and Comparative Example 1 were allowed to stand at room temperature for 7 days in a saturated moisture atmosphere. After blotting to remove extraneous surface moisture, each sample was immediately loaded into a TGA cell and heated to 150° C. at 25° C./min and held at 150° C. for 30 min. The weight loss was taken as the amount of moisture absorbed by each sample because of exposure to the humid atmosphere. The following results were obtained:
Avimid K from Comparative Example 1: 2.0% moisture absorbed
Avimid K 95%+1,4-bis(4-phenoxybenzoyl)benzene (DTD) 5% from Example 1: 1.6% moisture absorbed
Avimid K 90%+1,4-bis(4-phenoxybenzoyl)benzene (DTD) 10% from Example 2: 1.2% moisture absorbed

EXAMPLE 9

Into a glass jar containing 40 g of a commercial poly-(amic acid) solution (Du Pont Pyralin ® PI-2540), 0.295 g of 1,3-bis(4-phenoxybenzoyl)benzene (DID) were added and the jar was placed on a roller to dissolve the 1,3-bis(4-phenoxybenzoyl)benzene (DID) into the solution (DID=5 wt % based on total solids). After dissolution, the solution was spin coated onto silicon wafers, heated to 135° C. for 30 minutes and then to 250° C. for 1 hour to produce ~10 micrometer thick polyimide films. Property data for this film compared to a similarly prepared PI-2540 film containing no 1,3-bis(4-phenoxybenzoyl)benzene (DID) is included in Table 1.

EXAMPLE 10

A similar procedure to that given in Example 9 was followed except that the spin coated poly(amic acid) films were heated at 135° C. for 30 minutes and then at 300° C. for 1 hour to obtain the polyimide film. Property data are included in Table 1.

EXAMPLE 11

Into a glass jar containing 40 g of a commerical poly(amic acid) solution (Du Pont Pyralin ® PI-2540), 0.622 g of 1,3-bis(4-phenoxybenzoyl)benzene (DID) were added and the jar was placed on a roller to dissolve the 1,3-bis(4-phenoxybenzoyl)benzene (DID) into the solution (DID=10 wt % based on total solids). After dissolution, the solution was spin coated onto silicon wafers, heated to 135° C. for 30 minutes and then to 250° C. for 1 hour to produce ~10 micrometer thick polyimide films.

Property data for this film compared to a similarly prepared PI-2540 film containing no 1,3-bis(4-phenoxybenzoyl)benzene (DID) is included in Table 1.

EXAMPLE 12

A similar procedure to that given in Example 11 was followed except that the spin coated poly(amic acid) films were heated at 135° C. for 30 minutes and then at 300° C. for 1 hour to obtain the polyimide film. Property data are included in Table 1.

EXAMPLE 13

Into a glass jar containing 40 g of a commercial poly(amic acid) solution (Du Pont Pyralyn® PI-2611), 0.284 g of 1,3-bis(4-phenoxybenzoyl)benzene (DID) were added and the jar was placed on a roller to dissolve the 1,3-bis(4-phenoxybenzoyl)benzene (DID) into the solution (DID=5 wt % based on total solids). After dissolution, the solution was spin coated onto silicon wafers, heated to 135° C. for 30 minutes and then to 250° C. for 1 hour to produce ~10 micrometer thick polyimide films.

Property data for this film compared to a similarly prepared PI-2611 film containing no 1,3-bis(4-phenoxybenzoyl)benzene (DID) is included in Table 1.

EXAMPLE 14

A similar procedure to that given in Example 13 was followed except that the spin coated poly(amic acid) films were heated at 135° C. for 30 minutes and then at 300° C. for 1 hour to obtain the polyimide film. Property data ar included in Table 1.

EXAMPLE 15

Into a glass jar containing 40 g of a commerical poly(amic acid) solution (Du Pont Pyralin ® PI-2611), 0.60 g of 1,3-bis(4-phenoxybenzoyl)benzene (DID) were added and the jar was placed on a roller to dissolve the 1,3-bis(4-phenoxybenzoyl)benzene (DID) into the solution (DID=10 wt % based on total solids). After dissolution, the solution was spin coated onto silicon wafers, heated to 135° C. for 30 minutes and then to 250° C. for 1 hour to produce approximately 10 micrometer thick polyimide films.

Property data for this film compared to a similarly prepared PI-2611 film containing no 1,3-bis(4-phenoxybenzoyl)benzene (DID) is included in Table 1.

EXAMPLE 16

A similar procedure to that given in Example 15 was followed except that the spin coated poly(amic acid) films were heated at 135° C. for 30 minutes and then at 300° C. for 1 hour to obtain the polyimide film. Property data are included in Table 1.

EXAMPLE 17

In a glass container, 95 g of an amorphous Du Pont Liquid Crystal Polymer (LCP) of the same type as Du Pont LCP grade HX-2000 (aromatic liquid crystalline polyester) with an inherent viscosity of 2.0 dl/g (5 mg/ml in 1/1 V/V 1,2-dichloroethane/p-chlorophenol) were dry blended with 5 g of oxydibenzophenone (ODBP). After drying overnight at 125° C. to remove any moisture present, the mixture was charged to a Haake torque rheometer (small bowl mixer, rotor blades) at 330° C., and mixed for 10 min at 64 rpm. Afterwards, the polymer melt was removed from the mixer via a brass spatula, allowed to cool to room temperature and then ground to a coarse powder in a Thomas cutter. The same procedure was followed to prepare a control sample containing no modifier. DSC measurements (Du Pont 1090, 20° C./min, 2nd heating scan) revealed a $T_g$ of 161° C. for the oxydibenzophenone (OBP) containing compound vs. 182° C. for the control indicating a plasticization of the Liquid Crystal Polymer (LCP) by the modifier. Gel permeation chromatography of the Liquid Crystal Polymer (LCP) samples containing the modifiers revealed essentially no degradation of the polymer molecular weight by these modifiers.

EXAMPLE 18

In a glass container, 43.2 g of Du Pont Liquid Crystal Polymer (LCP) type HX-3000 (aromatic liquid crystalline polyester) with an inherent viscosity of 0.97 dl/g (5 mg/ml in 1/1 V/V 1,2-dichloroethane/p-chlorophenol) were dry blended with 4.8 g of 1,4ibis(4-phenoxybenzoyl)benzene (DTD) and 72 g of Harbison Walker GP7I fused silica. After drying overnight at 125° C. to remove any moisture present, the mixture was charged to a Haake torque rheometer (small bowl mixer, rotor blades) at 340° C., and mixed for 5 min at 64 rpm. Afterwards, the polymer melt was removed from the mixer via a brass spatula, allowed to cool to room temperature and then ground to a coarse powder in a Thomas cutter. The same procedure was followed to prepare a similar compound containing only Liquid Crystal Polymer (LCP) and silica but no 1,4-bis(4-phenoxybenzoyl)benzene (DTD) (48 g LCP, 72 g silica, control sample). DSC measurements (Du Pont 1090, 20° C./min, 2nd heating scan) revealed a Tm of 308° C. for the 1,4-bis(4-phenoxybenzoyl)benzene (DTD) containing compound vs. 316° C. for the control indicating an interaction between the Liquid Crystal Polymer (LCP) and 1,4-bis(4-phenoxybenzoyl)benzene (DTD). Similarly, upon cooling from the melt in the DSC, the 1,4-bis(4-phenoxybenzoyl)benzene (DTD) containing sample exhibited a crystallization exotherm at 232° C. vs. 243° C. for the control sample. Capillary melt rheology (340° C., L=3.1, d=0.029, L/d=106.897) gave a melt viscosity of 116 Pa.s at 100 1/s for the 1,4-bis(4-phenoxybenzoyl)benzene (DTD) containing sample vs. 130 Pa.s for the control (11% reduction). Gel permeation chromatography of the Liquid Crystal Polymer (LCP) samples containing the modifiers revealed essentially no degradation of the polymer molecular weight.

EXAMPLE 19

In a glass container 63 g of the aromatic polyester of Bisphenol A and isophthalic acid (Du Pont trade name Arylon 101) was dry blended with 7 g of Oxydibenzophenone (ODBP). After drying overnight at 125° C. to remove any moisture present, the mixture (90% Arylon 101/10% ODBP) was charged to a Haake torque rheometer (small bowl mixer, high shear cam mixing blades) at 330° C., and mixed for 10 min at 64 rpm. Afterwards, the polymer melt was removed from the mixer via a brass spatula, allowed to cool to room temperature and then ground to a coarse powder in a Thomas cutter. DSC measurements (Du Pont 1090, 20° C. /min, 2nd heating scan) revealed a $T_g$ of 138° C. Arylon 101 containing no oxydibenzophenone (ODBP) but prepared under the same processing conditions was found to have a $T_g$ of 185° C. indicating the plasticizing effect of the modifier.

EXAMPLE 20

A similar polyester (56 g) to that described in Example 13 was dry blended with 14 g of oxydibenzophenone (ODBP) (20 wt. % ODBP). By the same procedure as that described in Example 13, this blend exhibited a $T_g$ of 104° C. vs. that of the same material without oxydibenzophenone (ODBP) which gave a $T_g$ of 181° C. again indicating the plasticizing ability of the modifier.

EXAMPLE 21

Preparation of 1,4-bis{4-([4-benzoyl]phenoxy)benzoyl}benzene (BDTDB)

In a 2 liter flask equipped with a nitrogen inlet, mechanical stirrer and condenser (with nitrogen outlet) were charged 100 g (0.2125 moles) of 1,4-bis (4-phenoxybenzoyl)benzene (DTD), 179 g (1.34 moles) of aluminum chloride and 800 ml of o-dichlorobenzene. To this stirring solution, 49.34 ml of benzoyl chloride (59.77 g, 0.4251 moles) in 200 ml o-dichlorobenzene were added dropwise at room temperature over 0.5 hr. The temperature rose somewhat during benzoyl chloride addition and after the addition was complete, the reaction temperature was raised to 95°–100° C. and held for about 2.5 hrs. Hydrochloric acid generated during the reaction was swept out with nitrogen and neutralized with aqueous sodium hydroxide solution. Afterwards, the reaction solution was cooled to room temperature and precipitated into methanol. The solid product was filtered off and allowed to air dry. It was then dissolved in hot o-dichlorobenzene, filtered through a heated coarse fritted filter, and allowed to cool and crystallize. After filtration, the white crystalline product was slurried twice in methanol to remove residual o-dichlorobenzene and then dried under vacuum with an nitrogen bleed at 150° C. A single, sharp melting point (by DSC, 20° C./min) was found for this material at 287.5° C. (peak maximum).

EXAMPLE 22

Preparation of oxydibenzophenone (ODBP)

In a similar manner to that described in the previous example, 89.96 g (0.5285 moles) of diphenyl ether and 122.7 ml (148.58 g, 1.057 moles) benzoyl chloride were dissolved in 1000 ml of o-dichlorobenzene. In 10–20 gram portions, 222 g (1.665 moles) of aluminum chloride were added under stirring. Hydrochloric acid generated during the reaction was swept out with nitrogen and neutralized with aqueous sodium hydroxide solution. After the complete addition of aluminum chloride, the temperature was slowly raised to 95°–100° C. and the reaction was allowed to proceed at this temperature for two hours. The reaction was subsequently cooled and allowed to continue overnight at room temperature. Afterwards, the reaction was precipitated into methanol, the product was isolated by filtration, and then the product was recrystallized with filtering from toluene (Melting point = 164°–165° C. by standard melting point apparatus).

EXAMPLE 23

Preparation of 1,3-bis(4-phenoxybenzoyl)benzene (DID)

Into a 2 liter flask equipped with a mechanical stirrer, thermometer, and nitrogen inlet and outlet, were charged 210 g (1.2338 moles) of diphenyl ether, 83.9 g (0.4132 moles) of isophthaloyl chloride, and 970 ml of methylene chloride. The solution was cooled to −5° C. by means of and acetone ice bath and then aluminum chloride (240 g, 1.8005 mole) was added in six 40 g portions. The temperature rose slightly during the addition of aluminum chloride and after the final addition the temperature was stabilized and held at 0° C. for thirty minutes. The solution was subsequently warmed to room temperature and held there for 1 hour. Afterwards, the solution was very slowly poured into agitated chilled demineralized water to deactivate the aluminum chloride (maximum water temperature reached was 28° C.). After stirring for 10 minutes, stirring was stopped and the very acidic upper layer was decanted off. The organic layer was subsequently washed several times with fresh dimeneralized water to remove the acid and filtered to remove solid impurities, e.g., elemental aluminum). Afterwards, methanol was slowly added to the organic layer (about 1/1 on a volume basis) with stirring and the product precipitated as short, white needles. Further purification was undertaken by slurrying 3X in isopropanol followed by filtration and drying. The short needles gave a DSC melting point (20° C./min) of 124° C.

EXAMPLE 24

Preparation of 1,4-bis(4-phenoxybenzoyl)benzene (DTD)

A similar procedure to Example 23 is followed, except o-dichlorobenzene is used as reaction solvent. The product is isolated by deactivating the aluminum chloride with water. The solid product is separated from o-dichlorobenzene by filtration and is then washed with water and/or methanol. After drying, the product is dissolved in hot o-dichlorobenzene, hot filtered, and allowed to recrystallize. After filtration, the product is washed with methanol to remove o-dichlorobenzene and then dried. Melting point (standard melting point apparatus) = 214°–215° C.

TABLE 1
Characterization of Polyimide Thin Films

| Sample | Polymer | % Modifier | Cure Temp. °C. | Appearance | % H₂O absorp- at 85% RH | Tensile Str. MPa | % Elong. | Modulus- GPa | CTE ppm | Dielec. Const. 1 MHz, dry |
|---|---|---|---|---|---|---|---|---|---|---|
| Control | PI-2611 | 0 | 250 | clear | | 381 | 37 | 6.2 | | |
| Ex. 13 | PI-2611 | 5 | 250 | slightly cloudy | | 341 | 28 | 6.4 | | |
| Ex. 15 | PI-2611 | 10 | 250 | cloudy | | 281 | 10 | 6.5 | | |
| Control | PI-2611 | 0 | 300 | clear | 1.7 | 382 | 42 | 5.5 | | |
| Ex. 14 | PI-2611 | 5 | 300 | slightly cloudy | 1.2 | 358 | 31 | 6.0 | | |
| Ex. 16 | PI-2611 | 10 | 300 | cloudy | 1.0 | 299 | 13 | 6.5 | | |
| Control | PI-2540 | 0 | 250 | clear | 3.5 | 164 | 86 | 1.6 | 30 | |
| Ex. 9 | PI-2540 | 5 | 250 | clear | 2.8 | 162 | 72 | 1.9 | | |
| Ex. 11 | PI-2540 | 10 | 250 | clear | 2.0 | 167 | 77 | 2.1 | 38 | |
| Control | PI-2540 | 0 | 300 | clear | | 201 | 96 | 1.4 | 26 | 3.2 |
| Ex. 10 | PI-2540 | 5 | 300 | clear | 2.8 | 158 | 64 | 1.6 | | |
| Ex. 12 | PI-2540 | 10 | 300 | clear | 1.8 | 160 | 73 | 1.9 | 35 | 2.9 |

What is claimed is:

1. A composition of matter comprising:
   (a) a condensation polymer selected from the group consisting of polyester and polyimide, and
   (b) a modifier consisting essentially of a compound having a formula $R^2-R^1-R^0-R^1-R^2$ wherein $R^0$ is $-\overset{O}{\underset{\|}{C}}-$ or $-\overset{O}{\underset{\|}{C}}-\phenyl-\overset{O}{\underset{\|}{C}}-$ $R^1$ is $-\phenyl-O-\phenyl-$ or $-\phenyl-\phenyl-$ $R^2$ is $-H$ or $-\overset{O}{\underset{\|}{C}}-\phenyl$.

2. A composition of matter as defined in claim 1, wherein the modifier has a polydispersity of substantially 1.

3. A composition of matter as defined in claim 1, wherein $R^0$ is $-\overset{O}{\underset{\|}{C}}-$ $R^1$ is $-\phenyl-O-\phenyl-$ and $R^2$ is $-H$.

4. A composition of matter as defined in claim 1, wherein $R^0$ is $-\overset{O}{\underset{\|}{C}}-\phenyl-\overset{O}{\underset{\|}{C}}-$ $R^1$ is $-\phenyl-O-\phenyl-$ and $R^2$ is $-H$.

5. A composition of matter as defined in claim 1, wherein $R^0$ is $-\overset{O}{\underset{\|}{C}}-\phenyl-\overset{O}{\underset{\|}{C}}-$ $R^1$ is

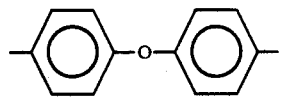
and R² is
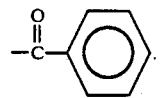
6. A composition of matter comprising
(a) a polyester and
(b) a modifier consisting essentially of a compound having the formula:
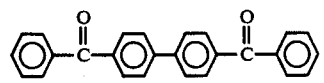
* * * * *